Jan. 19, 1932.     C. R. NICHOLS ET AL     1,842,362
ELECTRICAL PROSPECTING
Original Filed July 19, 1927    2 Sheets-Sheet 1

INVENTORS
CHARLES R. NICHOLS
AND SAMUEL H. WILLISTON
BY J. E. Hubbell
ATTORNEY

Jan. 19, 1932.     C. R. NICHOLS ET AL     1,842,362
ELECTRICAL PROSPECTING
Original Filed July 19, 1927     2 Sheets-Sheet 2

INVENTORS
CHARLES R. NICHOLS
AND SAMUEL H. WILLISTON
BY J. E. Hubbell
ATTORNEY

Patented Jan. 19, 1932

1,842,362

UNITED STATES PATENT OFFICE

CHARLES R. NICHOLS AND SAMUEL H. WILLISTON, OF DALLAS, TEXAS

ELECTRICAL PROSPECTING

Application filed July 19, 1927, Serial No. 206,829. Renewed November 12, 1931.

The general object of the present invention is to provide an improved method of, and apparatus for determining the location and character of the sub-surface bodies or earth portions of different electrical resistance from the adjacent earth portions. Our present invention was primarily devised for use in locating deposits of petroleum, but the invention is well adapted also, to the location of ore deposits of higher conductivity than the adjacent earth portions. In extended experimentation and in practical use of our invention in various oil fields in this country, we have found that natural subsurface bodies of oil sands invariably produce potential center displacement effects of the character which would be produced if the specific resistance of those bodies were substantially lower than that of the adjacent earth. We recognize the possibility that such displacements may be due to saline matter associated with the oil sands and not to the direct action of the latter, but are not certain that this is the case.

In the use of the present invention we energize an observation field by causing an electric current flow through the earth between points thereof on which different potentials are impressed, as by means of electrodes inserted in the earth and connected to the terminals of an electric generator or generators, in order that the resultant current flow distribution through the earth may be determined, or compared with the current distribution which would result from such energization if the earth beneath the observation field were of uniform conductivity.

While others have proposed to energize an exploration field for the purpose mentioned, our invention is distinguished from all prior methods of electrical prospecting known to us in the manner in which the observation field is energized, and in particular by the fact that our method of energization results in the creation of equi-potential lines which intersect at a point in the earth's surface and thereby define a potential center, whereas the methods of energization heretofore practiced or proposed do not create intersecting equi-potential lines defining potential centers, or points, as distinguished from lines.

The potential centers created by the practice of our invention are comparatively easy to locate, and their location ordinarily gives more valuable information than can be obtained by tracing out the non-intersecting equi-potential lines produced by prior methods of energization, even though a much larger number of points are located on said non-intersecting lines, than are required for the location of potential centers produced by the practice of the present invention.

In a simple mode of practicing the present invention the energized points are located at the corners of a simple geometrical figure so that a potential center will be formed in the field of observation by the intersection of iso-potential lines passing between different pairs of energized points. The potential center thus formed will coincide with the geographical center of said geometrical figure if the earth resistance beneath the exploration field is uniform, but if oil bearing sands or other disturbing bodies lie beneath the observation field, the potential center will be displaced from the geographical center in a direction and to an extent depending upon the character and location of the disturbing body.

With other modes of carrying out the present invention, potential centers bearing different relations to the energization points may be produced and located. For example, with energization points located at the corners of a square or rectangle, it is possible, by successively varying the relative strengths of the currents flowing through the energization points of the same polarity, to successively create a large number of different potential centers without change in the location of the points of energization. The exact point on the observation field at which each such potential center will be located if the earth resistance beneath the exploration field is uniform, can be predetermined, and the displacement, if any, of the observed potential center from said point gives readily interpreted information concerning the location and character of disturbing bodies beneath the surface of the exploration field. In addition to the two specific modes of practicing the invention already mentioned, there are others which may be employed, some of which are hereinafter referred to in some detail.

In general we consider it desirable in order that disturbing induction effects may be avoided, to energize the observation field by means of a direct current generator, but the energization may also be effected from a source of alternating current, in which case the potential center may be located by means of a detecting circuit including an antenna, or antennæ, and amplifying means such as are employed in radio receiving circuits.

In general, to cover any extended field of exploration, it is necessary with our improved method, as with the methods of our prior applications hereinafter mentioned, to successively establish a plurality of different observation fields each covering a different portion of the exploration field, and to determine the character of the earth structure below the exploration field from the information collectively furnished by the observations made in connection with the different observation fields.

The potential center displacement method of electrical prospecting permits of the rapid systematic and relatively inexpensive exploration of an extended field of exploration, and is characterized by the ease and comparative accuracy with which the observation results obtained may be coordinated, compared and interpreted. With the present invention the observational data obtained are always direct and positive, in that the direction of potential center displacement is a definite indication of the relative locations of the geographic norm of each observation field and the disturbing body. The results obtained are thus more direct and positive than those obtained with methods of electrical prospecting heretofore proposed in which the effect of a disturbing body on the elongated iso-potential lines to be located, may be very different with different relative locations of the disturbing body and the energization points or lines of the observation field.

The various features of novelty which characterize our invention are pointed out with particularity in the claims annexed to and forming a part of this specification. For a better understanding of our invention, however, its advantages and specific objects attained with the use, reference should be had to the accompanying drawings and descriptive matter in which we have illustrated and described preferred embodiments of our invention.

Figure 2:
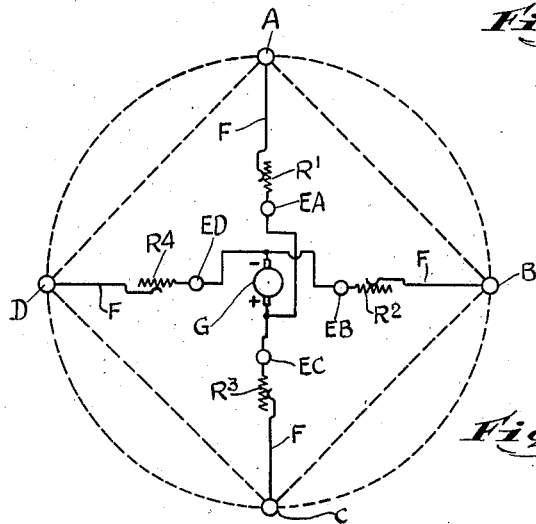
Fig. 2 is a diagrammatic representation of an observation field energizing system.

In the observation field energizing system diagrammatically illustrated in Fig. 2, the energization points A, B, C and D are located at the corners of a square, the diagonally opposed points A and C being connected by corresponding conductors F to the positive side of a direct current generator G, while the other two energization points D and B are connected by corresponding conductors F to the negative side of the generator. Variable resistances $R'$, $R^2$, $R^3$ and $R^4$ are shown as provided in the conductors F running to the different points A, B, C and D. By adjusting the resistances, for example the resistances $R^2$ and $R^3$, in two circuit branches F, of opposite polarity, the same current flow into or out of the earth at each energization point may be secured. EA, EB, EC and ED are ammeters in the different conductors F, the readings of which indicate when and how the resistances $R^2$ and $R^3$ need to be adjusted to obtain and maintain the desired uniformity of energization. Contact between the corresponding conductor F and the earth at each of the energization points A, B, C and D may be effected in any usual or suitable manner. Ordinarily this contact is effected by inserting a plurality of metallic pegs or electrodes in the earth distributed over an area of 10 to 100 feet or so in diameter, the center of which may be assumed to be the energization point, mathematically considered, especially as the area in which the electrode pegs are inserted is very small in comparison with the distances between the energization points, which in practice may well vary from a minimum of 400 or 500 yards, up to 2 or 3 or more miles. To insure good contact, and to avoid polarization difficulties, the ground in the vicinity of each electrode peg may be wetted with a solution of a salt of the metal forming the peg, for instance, a solution of copper sulphate when the pegs are made of brass, or may be wetted by a solution of any other salt adapted to serve as an electrolyte, or the earth may simply be wetted with water in many cases.

Figure 1:
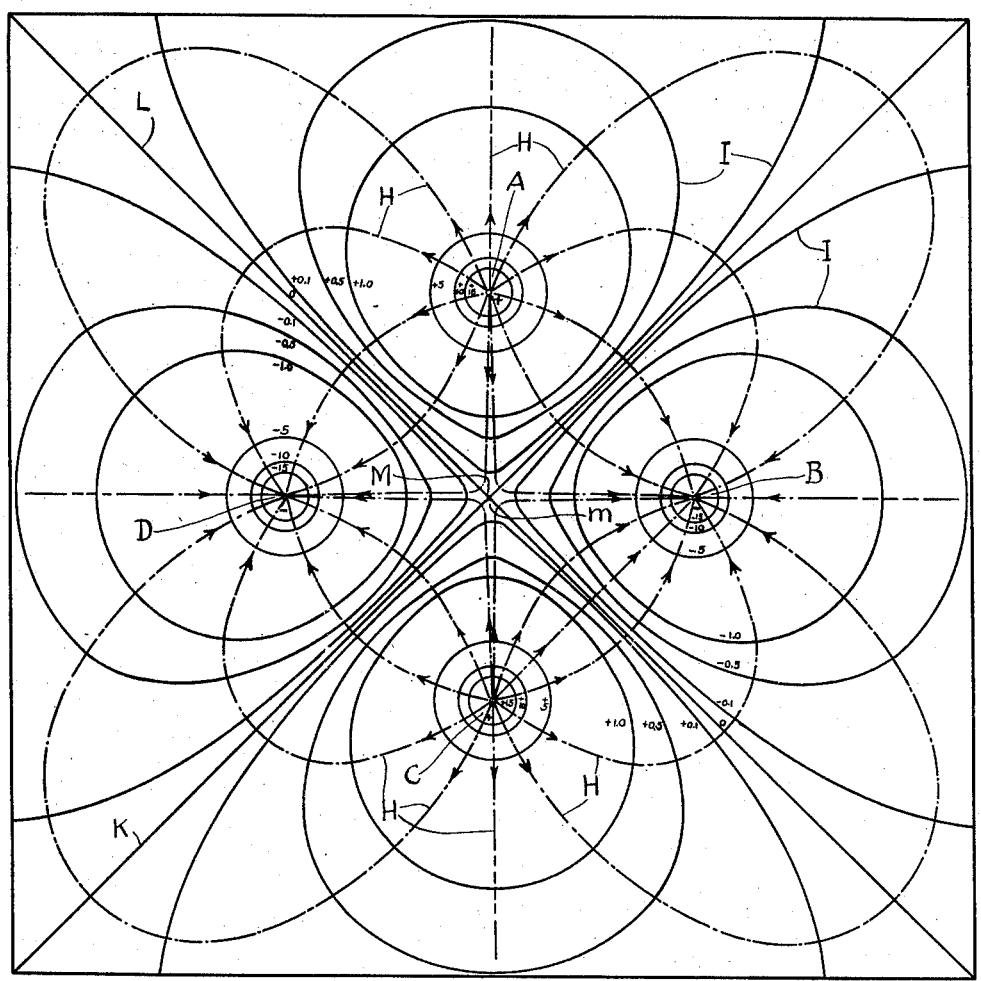
Fig. 1 is a chart diagrammatically illustrating current flow distribution and potential variations at the surface of an observation field under certain conditions.

Fig. 1 is a chart illustrating the direction of current flow and potential variations at the surface of the earth forming an observation field energized as shown in Fig. 2 when the portion of the earth near enough to the observation field to significantly affect the flow distribution and potential variations at the surface of the field of observation, is of uniform conductivity. In such case there will be an iso-potential line K passing midway between the energization points D and C, and midway between the energization points A and B, and a second iso-potential line L passing midway between the points A and D, and midway between the points B and C. These lines are perpendicular to one another, and intersect at the potential center point M, which in this case is coincident with the geographic center $m$ of the field of observation.

We use the term iso-potential herein to designate a line like the lines K and L in that all points along the line are at the same potential. Such a line may also be called an equi-potential line. The iso-potential lines K and L may also be called zero potential lines since no change in potential at points along those lines is created by the artificial earth energization current flow. In addition to the zero-potential lines K and L, any number of other iso-potential lines which are not zero potential lines, may be traced on the field of observation. Some of these other iso-potential lines are shown in Fig. 1, and are designated by the symbol I. The iso-potential lines are closed curves. If the earth were of uniform conductivity, the lines L and K would theoretically be great circles, and each other iso-potential line I would lie in one of the quadrants formed by the intersection of the planes including the great circles K and L. In practice, of course, the distance from an observation field at which measurable potential differences are created by the energization of the corresponding points A, B, C and D in ordinary electrical prospecting work is nothing like as great as the half circumference of the earth. The direction of current flow at the earth surface or in the earth at any point is normal to the iso-potential line or surface at that point. In Fig. 1, the lines H indicate the manner in which the direction of current flow varies over the observation field.

In locating the potential center M of an observation field energized in accordance with the present invention, the general method of procedure is to shift exploring contacts O and N over the observation field in the neighborhood of the geographic center $m$ of the latter or in the neighborhood of the expected position of the potential center M, until a galvanometer or other detecting instrument EE connected to the exploring contacts shows the latter to be at the same potential when either is moved along a line intersecting a line on which the other exploring control is located. This condition can only exist when those lines are intersecting equi-potential lines, as are the lines K and L of Fig. 1. In general the detecting circuit including the contacts O and N and instrument E may be identical with arrangements heretofore proposed for locating points on iso-potential lines. The potential center M may be located in actual practice, without direct location of either intersecting line K and L. After locating a few points on the curves I shown in two opposing quadrants in Fig. 3, it is possible to draw lines between correspondingly located points on the opposite limbs of the curves I, which intersect at the potential center M or as near thereto as is practically required.

Figure 3:
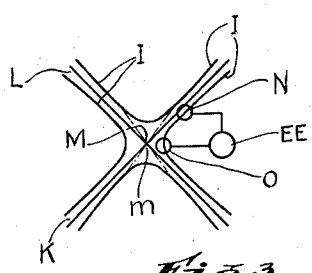
Fig. 3 is a diagrammatic representation of means for determining potential differences between points on the earth's surface.
Figure 8:
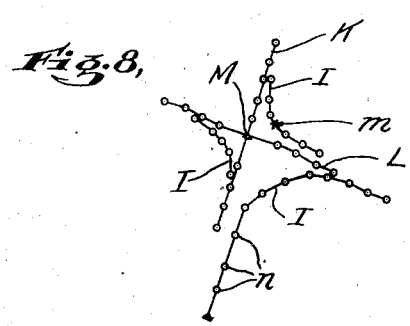
Fig. 8 is a map of a portion of an observation field showing iso-potential lines traced in locating a potential center displaced from the geographic center of the field.

In the map shown in Fig. 8 the circles $n$ represent exploring contact position points on iso-potential lines I, K and L actually located in accordance with the procedure described in Fig. 3 in determining the position of the potential center M of the field of observation in which the potential center is displaced from the geographic center $m$ of the field by sub-surface oil bearing sands. In Fig. 8 more exploring electrode position points are shown than are ordinarily required in a single observation field to determine the displacement of the potential center by oil bearing sands beneath the field.

In practice the detecting circuit illustrated in Fig. 3 may well include such amplifying provisions and provisions for eliminating the stray earth currents as are disclosed and claimed in our prior application Serial No. 129,430, filed August 16, 1926. In practice, also, the energization currents supplied by the generator G may advantageously be interrupted and reversed at regular intervals as described in said prior application. The features of our invention disclosed in our prior application and referred to above need not be described in detail herein, however, as they form no part of the present invention, and while they may advantageously be used in carrying out the present invention, the latter may be carried out in other ways and by other instrumentalities.

Figure 4:
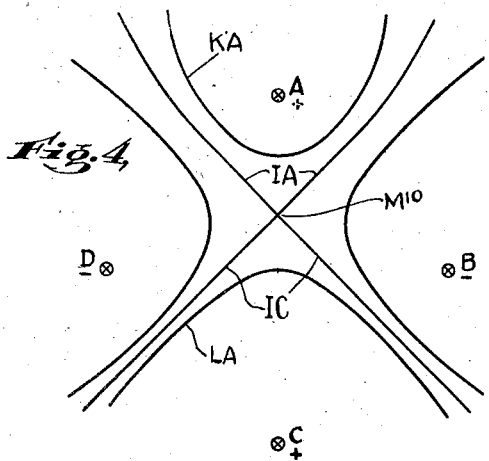
Fig. 4 is a diagram illustrating the effects obtained by an unequal distribution of current among different energization points.

Fig. 4 illustrates the location of the potential center $M^{10}$ formed with the apparatus shown in Fig. 2, when the various resistances $R'$, $R^2$, $R^3$ and $R^4$ are so adjusted that the same current flow between the earth and the generator is had at the energization points D and B, while the current flow between the earth and the generator is greater at the point C than at the point A. Around each of the unequally energized points A and C, are equi-potential lines IA and IC, respectively, comprising clearly defined opposing corner portions, the apices of which coincide at the potential center $M^{10}$.

The potential center $M^{10}$ thus formed by the intersection of the equi-potential lines IA and IC can be located with comparative ease. When the resistance of the earth beneath the exploration field is uniform, the center will lie on the line AC, and at relative distances from the points A and C which depend upon the division of current passing between the generator and the earth at the points A and C, and can be accurately calculated by a proper application of Ohm's law. A disturbing body beneath the earth's surface may shift the point of potential center $M^{10}$ along the line AC, or laterally to one side or the other of the latter. In either event the displacement of the actually located potential center from the point at which the center would lie if the earth underlying the exploration field were of uniform resistance may be utilized directly or indirectly to determine the character and location of the disturbing body or bodies creating the displacement.

Figure 5:
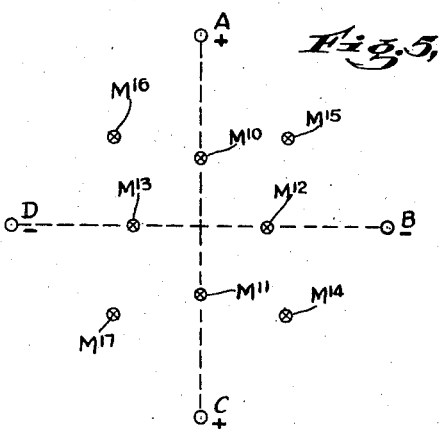
Fig. 5 is a diagram illustrating different potential center locations obtained by varying current distribution.

By following the general procedure described in connection with Fig. 4, it is possible to successively create and locate a multiplicity of potential centers at different points in the surface of an observation field energized at one and the same set of points A, B, C and D. For example, in Fig. 5, $M^{10}$—$M^{17}$ represent different potential centers which may be located on the surface of an observation field overlying a portion of the earth of uniform conductivity by a few simple changes in the relative strength of the currents flowing between the source of current and the earth at the energization points A, B, C and D. In Fig. 5, $M^{10}$ represents the same potential center as is shown in Fig. 4. $M^{11}$ represents the potential center created by decreasing the current flow at the point C and increasing it at the point A until the last mentioned current flow exceeds the current flow at C in a predetermined amount. The potential center $M^{12}$ is created by equal current flows at A and C and a greater current flow at D than at B. $M^{13}$ represents the potential center created when the current flow at A and C is the same and the current flow at B is greater than at D.

$M^{14}$ represents a potential center created when the current flows at C and B are alike and are less than the equal current flows at A and D. $M^{15}$ is a potential center defined by making the current flow at A equal to that at B and less than each of the similar current flows at C and D. $M^{16}$ is a potential center created by making the current flows at A and D equal and less than the similar current flows at C and B; and $M^{17}$ is the potential center created by making the current flow at D and C equal and less than the similar current flows at B and D.

If the current flow at A is twice the current flow at C the point $M^{11}$ will not be as near C as it will if the current flow at A is three times that at C. By thus changing the relative current strengths at the different energization points, other sets of potential centers like the set shown in Fig. 5, may be located in the same observation field without changing the location of the energization points A, B, C and D. For such purposes as locating bodies of oil bearing sands it will be ordinarily unnecessary to create and utilize a great multiplicity of potential centers in a single observation field, and in many cases the location of a single potential center may well be sufficient if the potential center so located is not displaced as a result of the presence of a disturbing body beneath the field. In determining the character of a non-homogenous earth structure beneath a large observation field, however, it may well be advantageous to successively create a considerable number of potential centers, and in particular to create more than one such set of points as are shown in Fig. 5, in certain, at least, of the different sections of the field of observation. By suitably varying the current distribution between the different energization points, it is possible to create a potential center within each of a number of comparatively small sized units or sections into which the observation field may be divided.

Figure 6:
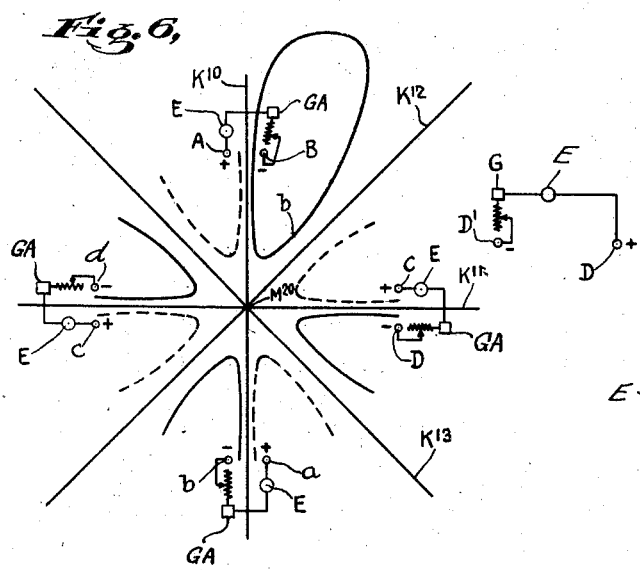
Fig. 6 is a diagrammatic representation of an alternative method of energizing an observation field.

It will be readily apparent that a greater number than two pairs of equally energized energization points, equally spaced along a circle and alternating in polarity, will result in as many zero potential lines as there are pairs of such points and these zero potential lines will all intersect at the center of the circle when the earth resistance below the observation field is uniform. The same general result may be obtained if the pairs of energization points A and B, C and D, etc. are not equally spaced, but are arranged as shown in Fig. 6, so that two points of each pair are spaced relatively closely together, while adjacent pairs of points are more widely spaced apart. The arrangement shown in Fig. 6, is of especial utility where in order to avoid laying transmission lines, or for other reasons the two energized points of each pair are energized by an individual generator or source of current shown as a separate generator GA.. R is a variable resistance, and E is a meter placed in each energization circuit shown in Fig. 6. With the arrangement shown in Fig. 6, the energized points of each pair need be separated but a few hundred feet, even though the field of observation may be so large that the distance between any one pair of energized points and any other pair of energized points amounts to thousands of feet.

As shown in Fig. 6, the energization points A, B, C, D, $a$, $b$, $c$ and $d$ are spaced about a circle with the points A and B diametrically opposed respectively to the points $a$ and $b$, and with the points C and D diametrically opposed to the points $c$ and $d$ respectively, and with a common distance between the points A and B and between the points C and D, and between the points $a$ and $b$, and between the points $c$ and $d$, which is relatively small as compared with the distance between the points B and C, and the similar distances between the points D and $a$, and between the points $b$ and $c$, and between the points $d$ and A. With the arrangement shown in Fig. 6, there is a mid-potential line $K^{10}$ passing between the points A and B, and between the points $b$ and $a$, and a second zero potential line $K^{11}$ passing between the points C and D, and the points $d$ and $c$; and in addition a zero potential line $K^{12}$ passing between the points B and C and the points $c$ and $b$, and a zero potential line $K^{13}$ passing between the points D and $a$ and between the points A and $d$. These zero potential lines all intersect at the potential center $M^{20}$ which corresponds with the geographical center of the circle on which the energization points are located, when the earth resistance beneath the observation field is uniform. It will be readily apparent that intersecting zero potential lines may be formed in the manner shown in Fig. 6, with three, or any larger number of suitably located pairs of energization points. In practice we regard four pairs of such points as preferable under ordinary conditions of use, to three, or five or more pairs.

Figure 7:
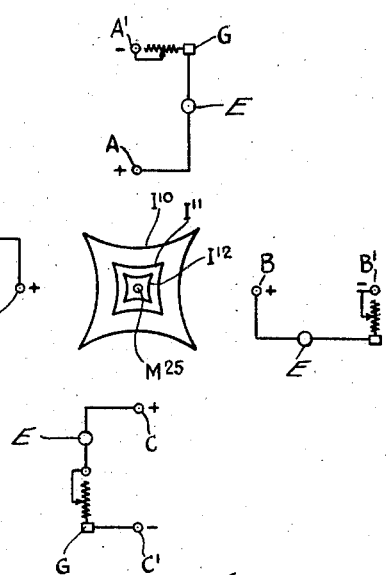
Fig. 7 illustrates another method of creating a potential center in an observation field.

Fig. 7 illustrates how a potential center $M^{25}$ may be created within an observation field energized by a plurality of three or more energization points of the same polarity located at points spaced about the potential center and operating in conjunction with energization points of opposing polarity suitably located without the field of observation.

As shown in Fig. 7, there are four energization points A, B, C, D, similarly energized and of like polarity located at points equally spaced about a geographical center point. As shown, the point A is energized by a current source G having one terminal connected to the earth at A and the other connected to the earth at a point A′ more remote from said geographical center point and on the line from the latter passing through the point A. The points B, C and D are similarly energized by other current sources G in conjunction with points B′, C′ and D′, respectively.

With the particular energization arrangement illustrated in Fig. 7, similar closed equi-potential lines $I^{10}$, $I^{11}$, $I^{12}$, etc. may be traced on the earth's surface about the potential center $M^{25}$ which is enclosed by each of said lines. Each such equi-potential line $I^{10}$, $I^{11}$ and $I^{12}$, with the arrangement of energization points shown in Fig. 7, is a figure having four sides each of which is concave. When the earth beneath the observation field is of uniform resistance, and the energization points are symmetrically disposed as illustrated, and are similarly energized, the different sides of each four sided figure are all alike. The potential center $M^{25}$ created in Fig. 7 represents the apex of an equi-potential surface, the portion of which immediately below the earth's surface may be described as coinciding with the surface of a pyramid having concave sides and a vertical axis, and having its apex in the earth's surface at the potential center point $M^{25}$. The different concave sides of said pyramid correspond with portions of bowl-shaped equi-potential surfaces in the earth curving about the different energization points A, B, C and D. The corners of the pyramid represent lines formed by the intersection of the said bowl-shaped surfaces about adjacent energization points, and these lines of intersection all intersect at the apex of the pyramid.

With the points A, B, C and D of Fig. 7 located at uniformly spaced points on a circle, and with the same current flow at each point, the potential center will lie at the center of the circle, provided the earth resistance beneath the observation field is uniform. However, by varying the relative current strengths at the different observation points different potential centers may be successively determined and located at varying predetermined points in the observation field provided the underlying earth is of uniform resistance in a manner analogous to that described in connection with Fig. 5. It is not strictly essential that the points A, B, C and D be located as illustrated, and the number of such points employed may be varied. In general, however, practical considerations and ease of interpreting the observation data obtainable ordinarily require the use of a comparatively small number of energization points and their symmetrical disposal at the corners of symmetrical geometrical figures. While the potential center $M^{25}$ created with the arrangement shown in Fig. 7, is at the intersection of equi-potential lines, those lines do not lie on the earth's surface, and the potential center cannot be located by tracing out equi-potential lines on the earth's center which intersect at the potential center.

The potential center $M^{25}$ of Fig. 7 is like the potential centers created with the arrangements shown in other Figs. however, in that it is a point on the earth's surface on which an identifying potential characteristic is impressed by the energization of the observation field. If the portion of the earth beneath the observation field is not of uniform resistance, the potential center created with each form of the invention illustrated herein is displaced from a predetermined geographic point in a direction and to an extent which can be measured, and which gives information as to the character and location of the disturbing bodies of greater value and more readily obtainable than the information obtainable with any prior method of electrical prospecting known to us and practically available under conditions of use for which the present invention is especially well adapted. The specific form of the invention disclosed and generically claimed herein and shown particularly by Figs. 1, 2, 4 and 6 in which the potential center located is formed by the intersection of zero potential lines, is disclosed but not claimed in our prior application Serial No. 147,310, filed November 9, 1926, of which this application is a continuation in part. Certain generic features of invention disclosed herein and in our copending application Serial No. 303,542, filed September 1, 1928, are generically claimed in the last mentioned application.

While in accordance with the provisions of the statutes, we have illustrated and described the best form of embodiment of our invention now known to us, it will be apparent to those skilled in the art that changes may be made in the form of the appartus disclosed without departing from the spirit of our invention as set forth in the appended claims and that in some cases certain features of our invention may be used to advantage without a corresponding use of other features.

Having now described our invention, what we claim as new and desire to secure by Letters Patent is:

1. In electrical prospecting the method of establishing an artificial ground field which consists in creating a potential center point on the earth's surface by causing measured electric currents to flow through the earth between separated earth points and thereby creating equi-potential lines which intersect at said potential center point.

2. In electrical prospecting the method of establishing an artificial ground field which consists in creating a potential center point on the earth's surface by causing electric currents of regulated relative strengths to flow through the earth between separated earth points and thereby creating equi-potential lines which intersect at said potential center point.

3. The method which consists in establishing an artificial ground field by causing electric currents of regulated relative strengths to flow through the earth between separated earth points and thereby creating equi-potential lines intersecting at a potential center point on the earth's surface, and determining the subsurface composition of the earth from the relation of the last mentioned point to a point fixed by its geographical relation to said earth points.

4. In the electrical determination of the sub-surface composition of the earth, the method of establishing an artificial ground field which consists in energizing points of the earth so displaced and with such opposing polarities as to thereby create two or more iso-potential lines intersecting at a point, which will or will not coincide with a predetermined point accordingly as the subsurface composition of the subjacent earth is or is not of uniform conductivity.

5. In the electrical determination of the sub-surface composition of the earth, the method of establishing an artificial ground field which consists in unequally energizing points of the earth so displaced and with such opposing polarities as to thereby create two or more iso-potential lines which intersect at a potential center point substantially displaced in a predetermined direction from a point centrally located with respect to the first mentioned points.

6. In the electrical determination of the sub-surface composition of the earth, the method of establishing artificial ground fields which consists in energizing points of the earth so displaced and with such opposing polarities as to thereby create two or more iso-potential lines intersecting at a point and successively varying the relative degrees of energization of the first mentioned points to thereby successively produce differently located iso-potential line intersection points.

7. In the electrical determination of the sub-surface composition of the earth, the method of establishing an artificial ground field which consists in simultaneously and proportionally energizing three or more pairs of points, the two points of each pair being symmetrically disposed at opposite sides of a line intersecting other lines correspondingly located with respect to the other pairs of points and the two points of each pair being closer to one another than to points of other pairs.

8. In the electrical determination of the sub-surface composition of the earth, the method which consists in separately energizing a plurality of observation fields suitably dispersed over the exploration field and in such manner that the energization of each field does not significantly affect the said energization of any other of said fields and so as to form in each observation field a plurality of iso-potential lines intersecting at a point, and comparing the direction and magnitude of displacement of the potential centers of said observation fields resulting from lack of conductive uniformity in the portion of the earth adjacent the different observation fields.

9. In the electrical determination of the subsurface composition of the earth, the method step which consists in energizing points of the earth so disposed and with such opposing polarities as to thereby create definitely proportioned current flows through the earth toward or from the different points of energization and to thereby create two or more equi-potential lines intersecting at a point.

10. In the electrical determination of the subsurface composition of the earth, the method step which consists in energizing points of the earth so disposed and with such polarities as to thereby create a plurality of equi-potential lines each of which intersects with two other of said lines and which collectively outline a polygonal figure on the earth's surface.

11. In the electrical determination of the subsurface composition of the earth, the method of energization which consists in impressing one polarity on each of a plurality of energization points located at the corners of a polygonal figure on the earth's surface and impressing an opposing polarity on other points on the earth's surface lying outside of and distributed about said figure.

Signed at Dallas, in the county of Dallas, and State of Texas, this 12th day of July, A. D. 1927.

CHARLES R. NICHOLS.
SAMUEL H. WILLISTON.